July 19, 1955  R. H. ROSENBERG  2,713,384
SEAT SLIDE CO-ORDINATING MECHANISM
Filed Dec. 12, 1952

INVENTOR.
Ralph H. Rosenberg.
BY
Harness, Dickey & Pierce
ATTORNEYS.

United States Patent Office 2,713,384
Patented July 19, 1955

2,713,384

SEAT SLIDE CO-ORDINATING MECHANISM

Ralph H. Rosenberg, Detroit, Mich., assignor to Ainsworth Manufacturing Corporation, Detroit, Mich., a corporation of Michigan Application December 12, 1952, Serial No. 325,632

3 Claims. (Cl. 155—14)

This invention relates to a latching mechanism, and more particularly to an improved seat slide latching mechanism adapted for use with seat slides of the type employed in automotive vehicles for adjusting the position of the seats of such vehicles.

Separate, parallel seat slides of the above mentioned type are conventionally mounted under each end portion of the front seat of the vehicle so that the operator may adjust the seat for maximum driving convenience and comfort and the present invention provides means for releasably latching the seat in a selected adjusted position.

An object of the present invention is to overcome disadvantages in prior seat slide latching mechanisms and to provide an improved latching mechanism particularly adapted to facilitate the simultaneous latching or unlatching of the individual seat slides.

Another object of the invention is to provide an improved latching mechanism which is rugged in construction and which may be easily and economically assembled with a minimum of labor and expense.

Another object of the invention is to provide an improved latching mechanism that may be readily adapted for installation on automobile seats of various widths and which is efficient and reliable in operation.

Still another object of the invention is to provide a compact seat slide latching mechanism that occupies a minimum of space under the vehicle seat so that relatively large heaters or other accessories may be accommodated thereunder and which is particularly adapted for installation in vehicles having a tunnel in the floor thereof.

Other objects and advantages of the invention will become apparent from the following description thereof when read in conjunction with the accompanying drawing wherein.

Figure 4:
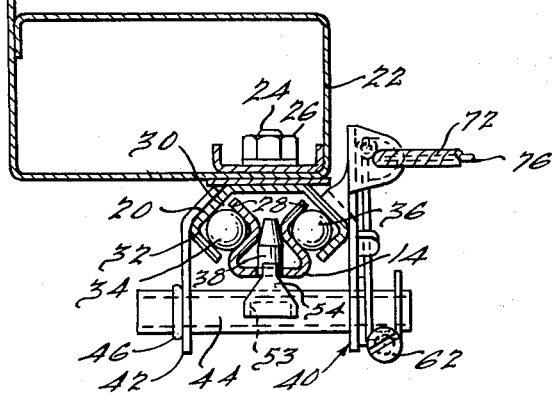
Fig. 4 is a sectional view taken on the line 4—4 of Fig. 2.

Referring to the drawing, a preferred embodiment of the invention is shown incorporated on a pair of horizontally disposed, parallel seat slides generally designated 10 and 12. While any seat slides may be used, it is preferred to use seat slides of the type disclosed in my application for Letters Patent, Serial No. 270,806 filed February 9, 1952. Such seat slides are identical in construction and, as best seen in Fig. 4, include a stationary lower channel-shaped member 14 mounted on an upright support 16 which, in turn, is rigidly secured to the floor 18 of the vehicle by any suitable means. A movable upper channel-shaped member 20 is secured to the seat frame 22 at a position near, but spaced from, the ends of the seat by studs 24 and nuts 26. The flanges of the lower member 14 are formed to define outwardly presented races 28 and the flanges of the upper member 20 are formed to define complementary inwardly presented races 30, the two races defining raceways 32 therebetween in which antifriction balls, such as 34 and 36, are disposed in rolling engagement with the races 28 and 30. In order to pre-stress the antifriction balls so as to obtain smooth operation of the slides and to prevent the raceways from opening sufficiently to permit the antifriction balls to drop out, pressure screws, such as 38, are threaded in the lower channel member 14 near the ends thereof.

Figure 1:
Figure 1 is a front elevational view of a seat installation incorporating the present invention.

The present invention provides means for simultaneously latching or unlatching the above mentioned seat slides so that the seat may be positioned for maximum driving convenience and comfort, and releasably locked in the selected adjusted position. The latching mechanism at each end of the seat includes a bearing member 40 rigidly secured to the inner flange of each upper channel member 20 intermediate the ends thereof and a bracket 42 rigidly secured to the outer flange of each channel member 20 and extending downwardly opposite the bearing member 40. A rock shaft 44 extends transversely under the web portion of each lower channel member 14 in spaced relation thereto and is journaled for oscillation in the bearing member 40 and bracket 42. A portion of each rock shaft 44 is upset or otherwise enlarged to form a collar portion 46, which bears against the bracket 42 and serves as retaining abutment. As best seen in Fig. 1, the rock shaft at one end of the seat, preferably the driver's end, projects through the downwardly extending skirt 48 of the seat and is bent upwardly and outwardly as at 50, the upper end portion of the shaft being stamped or otherwise shaped to form a handle 52. At the other end of the seat, the rock shaft in the preferred embodiment of the invention terminates at a position near, but spaced from, the collar portion 46, since an actuating handle is not required, as will be explained hereinafter in greater detail.

It will of course be understood that an actuating handle could be provided at both ends of the seat to permit actuation of the latching mechanism from either end of the seat. Intermediate the downwardly extending portions of each bearing member 40 and bracket 42, a slot 53 is provided in each rock shaft adapted to accommodate therein one end portion of a latch member 54. Each latch member extends forwardly and upwardly and the forward end engages one of a plurality of spaced openings 55 provided in the web portion of each lower channel member 14.

For the purpose of co-ordinating the latching mechanism at the driver's end of the seat with the latching mechanism provided on the other end of the seat, rocker arms 58 are provided which extend radially from each rock shaft adjacent the inner face of each bearing member 40. In order to clamp the rocker arms to the rock shafts, the lower end portion of each rocker arm 58 is return bent to form a U-sectioned portion and aligned openings are provided in the flanges of each U-sectioned portion adapted to accommodate the inwardly projecting end portion of each rock shaft. A transverse slot 60 is also provided in the web of each U-sectioned portion and a bolt 62 extends transversely thereof beneath the rock shaft and threadably engages a nut 64. With such a construction, the rocker arms may be securely clamped to the rock shafts by tightening the nut on the bolt.

At the driver's end of the seat, flange portion 70 of the bearing member 40 extends upwardly and rearwardly and the sleeves 72 of a conventional Bowden wire is rigidly secured to the inwardly projecting portion 74 of the flange portion 70 while the coaxial wire 76 of the Bowden wire is secured to the inwardly projecting portion 78 provided at the upper end of rocker arm 58. The Bowden wire extends transversely of the vehicle over the tunnel 80 which may be provided in the floor thereof and under the seat. The other end portion of the sleeve 72 of the Bowden wire is secured to the inwardly projecting portion of the flange portion 70 which extends forwardly of the bearing member on that side of the seat. Abutment stops 82 and 84 are also provided in each bearing member, spaced forwardly of the rocker arms and serve to limit the forward travel of the rocker arms. The rocker arms are biased by the horizontally extending springs 86 and 88 which are secured to the flange portions 70 and which function to return the rocker arms to the normal position when the actuating handle is released. The springs 86 and 88 also function to hold the latch members 54 in engagement with the openings 55 on the web portion of each lower channel member 14 so as to securely lock the seat slides.

Figures 2, 3:
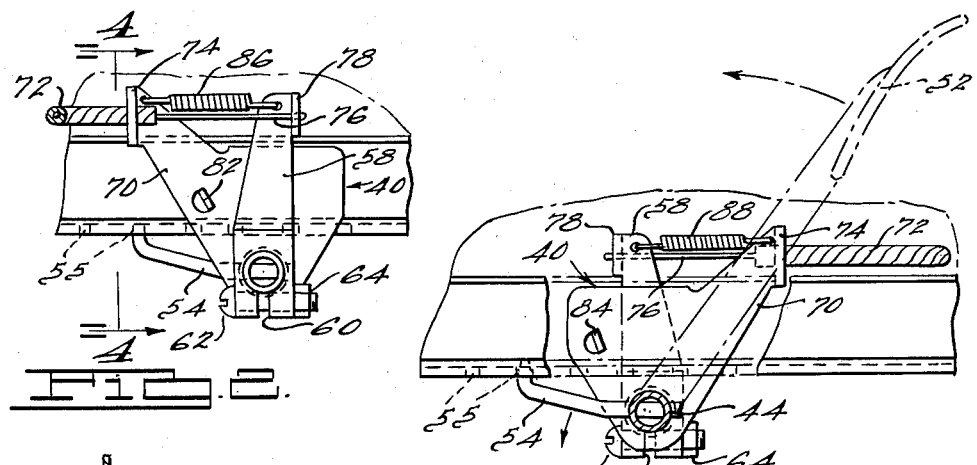
Fig. 2 is an enlarged, fragmentary, sectional view taken on the line 2—2 of Fig. 1.
Fig. 3 is an enlarged, fragmentary, sectional view taken on the line 3—3 of Fig. 1.

In the operation of the present invention, movement of the handle 52 in a forward direction causes the rock shaft 44 at the driver's end of the seat to rotate in a counterclockwise direction, as viewed in Fig. 3, thereby moving the associated latch member 54 downwardly and disengaging it from the opening 55 so as to unlatch the seat slide at the driver's end of the seat. The rocker arm 58 at the driver's end of the seat moves in a counterclockwise direction at the same time, thereby pulling the wire 76 in a forward direction. The movement of the wire 76 in a forward direction simultaneously moves the rocker arm at the opposite end of the seat in a counterclockwise direction, as viewed in Fig. 2, thereby rotating the rock shaft at that end of the seat in a counterclockwise direction so as to swing the associated latch member downwardly and simultaneously unlatching the seat slide at that end of the seat. When the handle 52 is released the pressure of the springs 86 and 88 moves both of the rocker arms in a clockwise direction since the wire 76 is free to slide in the sleeve 72. The rock shafts 44 also move simultaneously in a clockwise direction, so that the latch members 54 simultaneously engage the openings 55 and latch the seat in the selected position.

While a preferred embodiment of the invention has been shown and described, it will, of course, be understood that various changes and modifications may be made without departing from the spirit and scope of the invention.

What is claimed is:

1. In a device of the character described, a seat slide having a lower stationary part and an upper movable part, a pair of transversely aligned arms fastened to said movable part depending below and disposed in embracing relation to said stationary part, a rockshaft extending transversely below said stationary part and carried by said arms, a latch fastened to said rockshaft between said arms swingable against said stationary part, catch means on said stationary part engageable by said latch to hold the movable part of the slide in a selected adjusted position on said stationary part, spring means holding said latch normally engaged with said catch means, a lever fastened to the shaft at the outer side of one arm, and stop means on said rockshaft at the outer side of the other of said depending arms co-operative with said lever to hold said shaft axially fixed with respect to said arms and to maintain said latch properly aligned with said catch means.

2. In a device of the character described, a seat slide having a lower stationary part and an upper movable part, a pair of depending transversely aligned arms fastened to said movable part disposed in embracing relation to and extending below said stationary part, a tubular rockshaft carried by said arms below and transverse to said stationary part having a longitudinal slot intermediate said arms, a latch extending into said slot and connected thereby to said rockshaft, catch means on said stationary part engageable by said latch to hold the movable part of the slide in a selected adjusted position on said stationary part, spring means holding said latch normally engaged with said catch means, and means holding said rockshaft associated with said arms and said latch aligned with said catch means including an upset formed in the tubing in the outer side of one arm and a lever fastened to the shaft at the outer side of the other of said arms.

3. In a device of the character described, a seat slide having a lower stationary part and an upper movable part, a pair of depending transversely aligned arms fastened to said movable part disposed in embracing relation to and extending below said stationary part, a tubular rockshaft carried by said arms below and transverse to said stationary part having a longitudinal slot intermediate said arms, a latch extending into said slot and connected thereby to said rockshaft, catch means on said stationary part engageable by said latch to hold the movable part of the slide in a selected adjusted position on said stationary part, spring means holding said latch normally engaged with said catch means, means holding sad rockshaft associated with said arms and said latch aligned with said catch means including an upset formed in the tubing in the outer side of one arm and a lever fastened to the shaft at the outer side of the other of said arms, and a handle comprising an extension of said rockshaft at the end thereof provided with said upset, said handle being manually operable from one end of a seat mounted on said slide and movable with said seat during adjustment thereof so as not to change the relative position between the handle and the person operating the same during such adjustment.

References Cited in the file of this patent

UNITED STATES PATENTS

| | | |
|---|---|---|
| 1,964,405 | Nenne | June 26, 1934 |
| 2,360,805 | Thoma | Oct. 17, 1944 |
| 2,420,728 | Ulrich | May 20, 1947 |
| 2,563,220 | Doty | Aug. 7, 1951 |
| 2,576,365 | Scott et al. | Nov. 27, 1951 |
| 2,614,608 | Ardussi | Oct. 21, 1952 |